United States Patent [19]

Neill et al.

[11] Patent Number: 4,666,988

[45] Date of Patent: May 19, 1987

[54] ETHYLENE COPOLYMERS REACTED WITH METAL OXIDES

[75] Inventors: Paul L. Neill, Lake Jackson; Kenneth L. Bryce, San Antonio; Gerald M. Lancaster, Freeport, all of Tex.

[73] Assignee: The Dow Chemical Company, Midland, Mich.

[21] Appl. No.: 662,322

[22] Filed: Oct. 18, 1984

[51] Int. Cl.$^4$ .............................................. C08L 33/02
[52] U.S. Cl. ..................................... 525/196; 525/221
[58] Field of Search ................................ 525/196, 221

[56] References Cited

U.S. PATENT DOCUMENTS

| | | | |
|---|---|---|---|
| 3,365,520 | 1/1968 | Foster et al. | 525/221 |
| 3,649,578 | 3/1972 | Bush et al. | 525/221 |
| 3,819,792 | 6/1974 | Ono et al. | 525/221 |
| 3,969,434 | 7/1976 | Powell et al. | 525/221 |
| 4,346,196 | 8/1982 | Hoh et al. | 525/146 |
| 4,371,583 | 2/1983 | Nelson | 525/196 |
| 4,550,141 | 10/1985 | Hoh | 525/221 |

*Primary Examiner*—Joseph L. Schofer
*Assistant Examiner*—Bernard Lipman
*Attorney, Agent, or Firm*—W. J. Lee

[57] ABSTRACT

Melt-reacted blends of ethylene/ carboxylic acid copolymers with metal oxides are improved by first incorporating the metal oxide into an ethylene copolymer of LDPE, HDPE, or LLDPE to form a concentrate or masterbatch, then melt-blending a minor amount of the concentrate into the ethylene/carboxylic acid copolymer thereby obtaining a uniform, homogeneous reaction of the metal oxide with the carboxylic acid groups. These melt-reacted blends provide tough molding resins. Especially preferred are melt-reacted blends of EAA with minor amounts of MgO/LLDPE concentrates.

8 Claims, No Drawings

ETHYLENE COPOLYMERS REACTED WITH METAL OXIDES

FIELD OF THE INVENTION

This pertains to ethylene copolymers having pendant carboxyl groups which are reacted with metal oxides.

BACKGROUND OF THE INVENTION

It is known that ethylene copolymers having pendant carboxylic acid groups are reactive with metal oxides, metal hydroxides, and metal hydrates to form metal salts of at least some of the carboxylic acid groups. The carboxylic acid groups are usually those provided by acrylic acid or methacrylic acid, or other such olefin acids, when copolymerized or interpolymerized with ethylene.

The ethylene/carboxyl-containing copolymers preferred in the present invention are commercially available, especially those of the type known as "interpolymer", but may also be of the type known as "graft copolymers" and "block copolymers". These expressions are known to practitioners of the art. Interpolymers are made by polymerizing a mixture of the monomers; graft copolymers are made by grafting olefin acid groups onto a polyethylene chain; block copolymers are those wherein long polymer chains comprise chain segments of a polymerized plurality of ethylene units and segments of a polymerized plurality of the carboxyl-containing monomer units.

As used herein the expression "olefin acids" refers to olefinically-unsaturated carboxylic acids which are copolymerizable with ethylene, especially acrylic acid, methacrylic acid, crotonic acid, and 1-buteneoic acid, most especially acrylic acid and methacrylic acid.

Patents which disclose interpolymerizations of ethylene and unsaturated carboxylic acids in a steady state reaction at high temperature and high pressure in a stirred reactor in the presence of a free-radical initiator are, e.g., Canadian Pat. No. 655,298 (and its U.S. Pat. counterpart No. 4,351,931); U.S. Pat. Nos. 3,239,270; 3,520,861; 3,658,741; 3,884,857; 3,988,509; 4,248,990; and 4,252,924.

Also included as a part of the present invention are polyethylenes and, preferably, certain ethylene interpolymers of the linear low density variety, known by the acronym LLDPE. These LLDPE resins are distinguishable from the non-linear (branched) low density polyethylene (LDPE) made by homopolymerizing ethylene using free-radical initiators; the LDPE resins contain branched chains of polymerized monomer units pendant from the main polymer "backbone" and generally have densities in the range of about 0.910 to about 0.935 gms/cc.

The LLDPE resins are also distinguishable from the linear high density polyethylene (HDPE) resins by the fact that these LLDPE resins are prepared by interpolymerizing ethylene with enough of a higher alpha-olefin to yield a linear ethylene copolymer which has a density, generally, in the same range of the LDPE. Linear HDPE generally has a density in the range of about 0.941 to about 0.965 gms/cc. Both HDPE and LLDPE are linear polymers, prepared using a coordination catalyst, e.g., the well-known Ziegler catalyst, or modifications thereof such as the Natta catalyst.

As used in this disclosure, the expression "ethylene polymers" refers to the homopolymers (LDPE and HDPE) and the ethylene/olefin interpolymers (LLDPE).

Some teachings about the differences in LDPE, HDPE, and LLDPE resins are found, e.g., in U.S. Pat. No. 4,327,009. A method of making various LLDPE resins is disclosed, e.g., in U.S. Pat. No. 4,076,698.

The addition of metal oxides to molten carboxyl-containing ethylene polymers, e.g., ethylene/acrylic acid (EAA) or ethylene/methacrylic acid (EMAA) is usually done by carrying the metal compounds, as a hydroxide or hydrate, in an aqueous carrier, employing, in some cases, an acid aqueous carrier to solubilize the metal. This causes bubbling of the water (as steam) and often has deleterious effects on the product sought to be made. See, e.g., U.S. Pat. No. 4,440,893 which proposes the use of an acetylene peroxy compound to alleviate bubble formation.

Directly blending dry anhydrous metal oxides (e.g. MgO, CaO, BaO, ZnO) into molten EAA or EMAA can be performed to avoid the use of aqueous carriers for the metal oxide, but because of the reactivity of the carboxylic acid groups with the metal oxides, non-homogeneous blending often occurs.

U.S. Pat. No. 4,420,580 discloses that inorganic metal fillers, e.g. polyvalent metal oxides, are made more compatible with a polyolefin resin, e.g., linear low density ethylene copolymers, by incorporating an ethylene/acrylic acid copolymer into a molten mixture of the polyolefin/metal oxide. In these blends, the polyolefin is present in significantly greater concentration than is the ethylene/acrylic acid copolymer.

Patents pertaining to ionomers are, e.g., U.S. Pat. Nos. 3,249,570; 3,264,272; 3,322,734; 3,379,702; 3,404,134; 3,649,578; 3,789,035; 3,969,434; and 3,970,626.

It is an object of the present invention to provide a means for blending metal oxides into molten ethylene copolymers having pendant carboxylic acid groups which avoids the use of aqueous carriers.

Another object is that of blending dry metal oxides into molten ethylene copolymers having pendant carboxylic acid groups, whereby excessive reaction of the metal oxide with the said acid groups is substantially minimized, thereby permitting a more uniform dispersion of the metal oxide to be made.

Yet another object is that of preparing a curable or cross-linkable composite comprising an ethylene copolymer, having pendant carboxylic acid groups, and having substantially uniformly dispersed therein at least one metal oxide.

These objects are substantially attained by the ways and means disclosed herein.

SUMMARY OF THE INVENTION

A substantially uniform dispersion of metal oxide particles in a carboxyl-containing ethylene copolymer is prepared by making a masterbatch blend of metal oxide in LDPE, HDPE, or LLDPE, then blending a minor amount of the masterbatch with a major amount of the carboxyl-containing ethylene copolymer. The preferred ethylene polymer is LLDPE.

DETAILED DESCRIPTIONS

The carboxyl-containing ethylene copolymer is one wherein the carboxyl-containing moiety comprises about 1% to about 40% by wt. of the ethylene copolymer. The carboxyl-containing moiety may be any of the olefin acids having 3 to about 12 carbon atoms, such as, acrylic acid, methacrylic acid, 1-buteneoic acid, crotonic acid, maleic acid, maleic anhydride, and the like, especially acrylic acid and/or methacrylic acid. These copolymers generally have melt flow values (MFV) in the range of about 1 g/10 min. to about 3000 g/10 min. as measured by ASTM D-1238 (Condition E) and, for these type of copolymers, are considered to be of intermediate to high molecular weight. The preferred range for the MFV is about 10 g/10 min. to about 500 g/10 min. and the preferred range for the amount of the carboxyl-containing moiety is about 1% to about 25% by wt.

The LLDPE resin preferably used is one wherein the alpha-olefin comonomer comprises about 0.2% to about 35% by wt of the interpolymer, the alpha-olefin having from 3 to about 12 carbon atoms, preferably 4 to 8 carbon atoms. Preferably the comonomer comprises about 1% to about 20% by wt. of the interpolymer. Octene-1 is an especially preferred comonomer. A mixture of the comonomers may be used in preparing the ethylene interpolymers, such as butene-1/octene-1 or hexene-1/octene-1. These LLDPE interpolymers are generally of intermediate to very high molecular weight, having MFV's in the range of about 1 g/10 min. to about 200 g/10 min. as measured by ASTM D-1238(E), preferably about 10 g/10 min. to about 70 g/10 min.

The LDPE and HDPE resins which may be used are normally solid homopolymers having melt indexes (MFV's) in the range of about 1 g/10 min. to about 200 g/10 min. as measured by ASTM D-1238(E).

Whereas there are many metal oxides which can be substantially uniformly dispersed in a carboxyl-containing ethylene copolymer by being carried in LLDPE in accordance with the method of the present invention, it is preferred that the metal oxide be at least one of the group comprising CaO, MgO, BaO, and ZnO, all of which are divalent. These divalent metals are readily available, are inexpensive, and provide beneficial crosslinking or curing of the carboxyl-containing ethylene copolymers without untoward discoloration.

The masterbatch of metal oxide in LLDPE, LDPE or HDPE is conveniently prepared by mixing at a temperature at which the ethylene polymer is molten or by any other methods which allow the metal oxide to be dispersed in the polymer, such as dispersing the metal oxide in a polymer solution and then removing the solvent. These ethylene polymers have little or no tendency to react with the metal oxide, thus the reactivity of the metal oxide is preserved for subsequent reaction with the carboxyl-containing ethylene copolymer. The ratio of metal oxide/ethylene polymer may be virtually any practical ratio which provides for efficient loading of the metal oxide into the carboxyl-containing ethylene copolymer without unduly overloading with ethylene polymer. A metal oxide/ethylene polymer ratio in the range of, e.g., 4/1 to 1/20 is particularly operable, though a ratio in the range of about 2/1 to about 1/5 is generally preferred; a ratio in the range of about 2/1 to about 1/2 is especially preferred.

The mixing of the masterbatch into the carboxyl-containing ethylene copolymer is done at melt temperatures to provide uniform blending. The amount of masterbatch per 100 parts of the copolymer is dependent on the amount of crosslinking one wishes to achieve. For example, 6 parts by weight of an ethylene polymer/MgO masterbatch of 1/1 wt. ratio, mixed into 94 parts by wt. of an ethylene/acrylic acid copolymer (20% A.A. by wt.; MFV of about 300 dg/10 min) crosslinks to a strong tough composite wherein the A.A. groups are about 50%, ±3%, crosslinked. The 3% ethylene polymer in the composite contributes to the overall strength, toughness, and abrasion-resistance of the final product, as well as serving to improve the dispersion of the MgO in the EAA copolymer. A convenient blending technique comprises the addition of masterbatch pellets to molten copolymer; the pellets become substantially uniformly distributed during the mixing and the distributed pellets disintegrate upon melting.

The preferred LLDPE has a different morphology from the branched-chain LDPE and the linear HDPE. The LLDPE is essentially a linear polymer having side-groups (not side-chains) along the polymer backbone due to the pendant alkyl moiety of the alpha-olefin comonomer which is interpolymerized with the ethylene. For example, the pendant alkyl moiety of 1-butene is —$CH_2CH_3$ and the pendant alkyl moiety of 1-octene is —$(CH_2)_5CH_3$.

The weight ratio of masterbatch/carboxyl-containing ethylene copolymer is variable over a wide range, depending on the amount of metal oxide in the masterbatch, and is preferably a ratio which will provide a final composition containing about 0.5–100 parts of LLDPE and about 0.5–10 parts of metal oxide per 100 parts of the acid copolymer.

Because of the compatibilizing effect of the ethylene polymer in the masterbatch, the metal oxide is more readily and evenly distributed in the carboxyl-containing ethylene copolymer, thus the reaction between the metal oxide and the carboxyl groups creates a substantially homogeneous final product which is substantially transparent or transluscent. As a result of this uniform chemical reaction the metal values become ionic groups on the copolymer chain and do not function as discrete particles or fillers. Fillers are known to form heterogeneous, substantially opaque blends with polymers by way of being inert, with respect to the polymers, or else by being non-uniformly or irregularly reacted if there is, in fact, a tendency to react.

The examples which follow are to illustrate particular embodiments, but the inventions is not limited to the embodiments illustrated.

Unless noted otherwise, the polymer properties are measured as follows:

| Physical Property | ASTM Standard |
|---|---|
| Melt Index (M.I.) or Melt Flow Value (M.F.V.) | D-1238 |
| Tensile Properties | D-638 and D-1248 |
| Tensile Yield | D-638 and D-1248 |
| % Elongation | D-638 and D-1248 |
| Hardness | D-2240 |
| Tensile Impact | D-1822 |
| Flexural Modulus | D-970 |
| Compression Molding Procedure | D-1928 |

EXAMPLE 1

(Comparative example; not invention)

Fine-particle MgO (3 parts) is blended with 100 parts of an ethylene/acrylic acid copolymer (20% A.A., 300 MFV) by being tumble-blended at ambient temperature for one hour, then the mixture is hand-fed into the hopper of a Werner-Pfleiderer twin-screw extruder. The extruder (a ZSK-53L extruder) is operated under the following conditions:

| | Zone Temperatures (°C.) |
|---|---|
| Screw (rpm) - 200 | Zone 1 - 177 |
| Torque (% screw) - 60 | 2 - 177 |
| Throughput (parts/hr) - 60 | 3 - 163 |
| Vacuum at Zone 6 - 30 psig | 4 - 163 |
| L/D ratio - 45 | 5 - 163 |
| Screw Diameter - 53 mm | 6 - 149 |
| | 7 - 149 |
| | 8 - 149 |

The extruded resin is found to contain high levels of unreacted MgO, observed as large white specks and was extremely difficult to process due to the variations in the degree of crosslinking. See Table 1 below for comparison data.

EXAMPLE 2

(EAA Plus MgO/ethylene polymer masterbatch)

Using the ZSK-53L extruder but with extrusion conditions given below, the same EAA copolymer of Example 1 is blended with a masterbatch. The masterbatch is a 50/50 mixture of 700 parts of fine particle MgO and 700 parts of an ethylene/1-octene copolymer (25 MFV, 0.921 density, 7% 1-octene) prepared in a Banbury mixer with the mixing blades operated at about 150 rpm for about 5 minutes until the polymer melts. Once blended the masterbatch is cooled and ground into particles. The masterbatch is fed (6 parts/hr.) through a feeder into the twin-screw extruder and the EAA copolymer is fed (50 parts/hr) simultaneously through a separate feeder. The extruded resin is clear and contains no visible levels of unreacted MgO. Because of the increased dispersability the extruder is operated effectively using a shorter L/D ratio which appreciably conserves energy.

| ZSK-53L Extruder Conditions | |
|---|---|
| | Zone Temperatures (°C.) |
| Screw (rpm) - 200 | Zone 1 - 185 |
| Torque (% screw) - 50 | 2 - 255 |
| Vacuum at Zones 3/4 - 29 psig | 3 - 255 |
| L/D ratio - 24 | 4 - 285 |
| Screw Diameter - 53 mm | |
| See Table I below | |
| for comparison data. | |

TABLE I

COMPARISON OF BLENDS OF EXAMPLE 1 AND EXAMPLE 2

| | Example 1 EAA/MgO* | Example 2 EAA/MgO—LLDPE |
|---|---|---|
| $I_2$ Melt Index (g/10 min) | 2.86** | 2.27 |
| Tensiles (psi) | 3890 | 4240 |
| Yield (psi) | 3890 | 3495 |
| Elongation (%) | 10 | 245 |
| Izod Impact (−50° C., ft-lb/in notch) | 0.49 | 1.82 |
| Tensile Impact (ft-lb/in²) | 33.9 | 262.4 |
| Density (g/cm³) | 1.168 | .964 |
| 2% Secant Modulus (psi) | 17,000 | 49,000 |
| Flexural Modulus (psi) | 23,000 | 52,000 |
| Visual Appearance | heterogeneous | homogeneous |

*Severe foaming was observed when the resin was reextruded without vacuum devolatilization.
**Melt index strand foamed indicating incomplete reaction of MgO with EAA.

EXAMPLE 3

A masterbatch (concentrate) of MgO/LLDPE, 1/1 ratio, is blended with EAA copolymer (20% AA, 300 M.I.) using the extruder conditions of Example 2 above. The feed rate to the extruder for the EAA copolymer is 75 parts/hour while the feed rate of the MgO/LLDPE concentrate is varied from 2.51 parts/hour to 3.85 parts/hour thus obtaining different levels of neutralization of the acid groups. Table II below shows the bulk physical properties of these blends. In general, as the concentration of the MgO in the EAA is increased, an improvement in physical properties is observed. This behaviour apparently results from the decreased mobility of the resin molecules. There also appears to be a limiting point where additional amounts of MgO do not cause additional property improvements.

TABLE II

BULK PHYSICAL PROPERTY RESULTS FOR VARIOUS EAA/MgO—LLDPE COMPOSITES

| | % AA Neutralized* (±2%) | | | | |
|---|---|---|---|---|---|
| | 35 | 40 | 45 | 52 | 55 |
| $I_2$ Melt Index (g/10 min) | 14.87 | 8.66 | 4.53 | 2.27 | .87 |
| $I_{10}$ Melt Index (g/10 min) | 84.14 | 51.72 | 29.98 | 12.95 | 4.01 |
| Melt Tension | .26 | .55 | .80 | 3.8 | 8.2 |
| Tensiles (psi) | 3375 | 3750 | 4015 | 4240 | 4190 |
| Yield (psi) | 2645 | 2750 | 2745 | 3495 | 3595 |
| Elongation (%) | 305 | 315 | 295 | 245 | 150 |
| Izon Impact (−50° C.; ft-lb/in notch) | .39 | .55 | 1.22 | 1.82 | .77 |
| Tensile Impact (ft-lb/in²) | 220.3 | 288.8 | 300.4 | 262.5 | ** |
| Hardness (Shore D) | 65 | 65 | 65 | 65 | 65 |
| Density (g/cm³) | .965 | .965 | .964 | .964 | .965 |
| 2% Secant Modulus (psi) | 41,000 | 43,000 | 44,000 | 49,000 | 48,000 |
| Flexural Modulus (psi) | 46,000 | 47,000 | 47,000 | 52,000 | 52,000 |
| Visual Appearance | clear*** | clear | clear | clear | clear |

*Values obtained from infrared analysis.
**Value could not be obtained due to equipment failure.
***A clear polymer is an indication of homogeneity.

EXAMPLE 4

(Comparative Data)

Using the same EAA as in Example 3 above, about 52% of the acid groups are neutralized with neat MgO and compared with another portion of the EAA which has about 52% of the acid groups neutralized with a 50/50 concentrate of MgO/LLDPE. The EAA/MgO blend is prepared in a Banbury mixer where the temperature reaches about 204° C. The EAA/concentrate blend is prepared in an extruder as in Example 2 above. The physical properties in Table III show improved properties using the concentrate; these improvements appear to be caused by the compatibility effect of the LLDPE.

TABLE III

COMPARISON OF THE PHYSICAL PROPERTIES FOR EAA/MgO COMPOSITE AND EAA/MgO—LLDPE COMPOSITE

| | EAA/MgO (52% neut.)* | EAA/MgO—LLDPE (52% neut.)* |
|---|---|---|
| $I_2$ Melt Index (g/10 min) | 2.71 | 2.22 |
| $I_{10}$ Melt Index (g/10 min) | 16.17 | 12.95 |

TABLE III-continued

COMPARISON OF THE PHYSICAL PROPERTIES FOR EAA/MgO COMPOSITE AND EAA/MgO—LLDPE COMPOSITE

| | EAA/MgO (52% neut.)* | EAA/MgO—LLDPE (52% neut.)* |
|---|---|---|
| Tensiles (psi) | 3505 | 4240 |
| Yield (psi) | 2755 | 3495 |
| Elongation (%) | 140 | 245 |
| Izod Impact (−50° C.; ft-lb/in notch) | 1.67 | 1.82 |
| Tensile Impact (ft-lb/in$^2$) | 181.8 | 262.4 |
| Hardness (Shore D) | 70 | 65 |
| Density (g/cm$^3$) | .965 | .964 |
| 2% Secant Modulus (psi) | 41,000 | 49,000 |
| Flexural Modulus (psi) | 44,000 | 52,000 |
| Visual Appearance | cloudy** | clear |

*Values obtained from infrared analysis.
**A cloudy polymer is an indication of heterogeneity.

EXAMPLE 5

In similar manner to the foregoing examples and comparisons, it is found that LDPE and HDPE, when mixed with MgO as a masterbatch concentrate, also improve the dispersivity of the MgO in the EAA copolymer, but LLDPE is preferred for such concentrates.

EXAMPLE 6

Blends of ethylene/carboxylic acid copolymers with minor amounts of metal oxide/ethylene polymers prepared in accordance with the present invention provide useful molding compositions and coating compositions. For example, the following melt-reacted blend is found to be useful, when compounded with fillers, colorants and the like, as injection molded or compression molded coverings for articles where toughness and scuff-resistance are needed, such as golf balls.

94% of EAA (20% AA, 300 M.I.)
6% of masterbatch of 1/1 ratio of MgO/LLDPE, where MgO is finely divided and LLDPE contains about 7% 1-octene interpolymerized with ethylene and has a density of about 0.92 gm/cc and M.I. of 25.

The above ingredients are melt-blended in an extruder where the LLDPE causes the MgO to be uniformly distributed throughout the EAA and a homogeneous reacted ionomer is formed.

We claim:

1. A substantially homogeneous, uniformly reacted blend comprising a major amount of an ethylene/olefinically-unsaturated carboxylic acid copolymer and a minor amount of a masterbatch blend of a metal oxide dispersed in an ethylene polymer, said ethylene polymer being at least one of the group consisting of LDPE, HDPE, and LLDPE, said masterbatch blend comprising a metal oxide/ethylene polymer ratio in the range of about 4/1 to 1/20, said reacted blend containing an amount of masterbatch which provides about 0.5 to about 10 parts of metal oxide and up to about 6 parts of said ethylene polymer per 100 parts of the acid copolymer, and said reacted blend being visually free of unreacted metal oxide.

2. The blend of claim 1 wherein the ethylene polymer is LLDPE.

3. The blend of claim 1 wherein the ethylene/olefinically-unsaturated carboxylic acid copolymer comprises at least one where the olefinically-unsaturated carboxylic acid is acrylic acid, methacrylic acid. 1-buteneoic acid, crotonic acid, maleic acid, or maleic anhydride.

4. The blend of claim 1 wherein the olefinically-unsaturated carboxylic acid is acrylic acid or methacrylic acid.

5. The blend of claim 1 wherein the olefinically-unsaturated carboxylic acid is acrylic acid.

6. The blend of claim 1 wherein the olefinically-unsaturated carboxylic acid is methacrylic acid.

7. The blend of claim 1 wherein the metal oxide is at least one selected from the group comprising CaO, MgO, BaO, and ZnO.

8. The blend of claim 1 wherein the metal oxide is MgO.

* * * * *